Nov. 7, 1961  K. P. RYAN  3,007,443
CATTLE FEEDER STRUCTURE
Filed Nov. 13, 1959
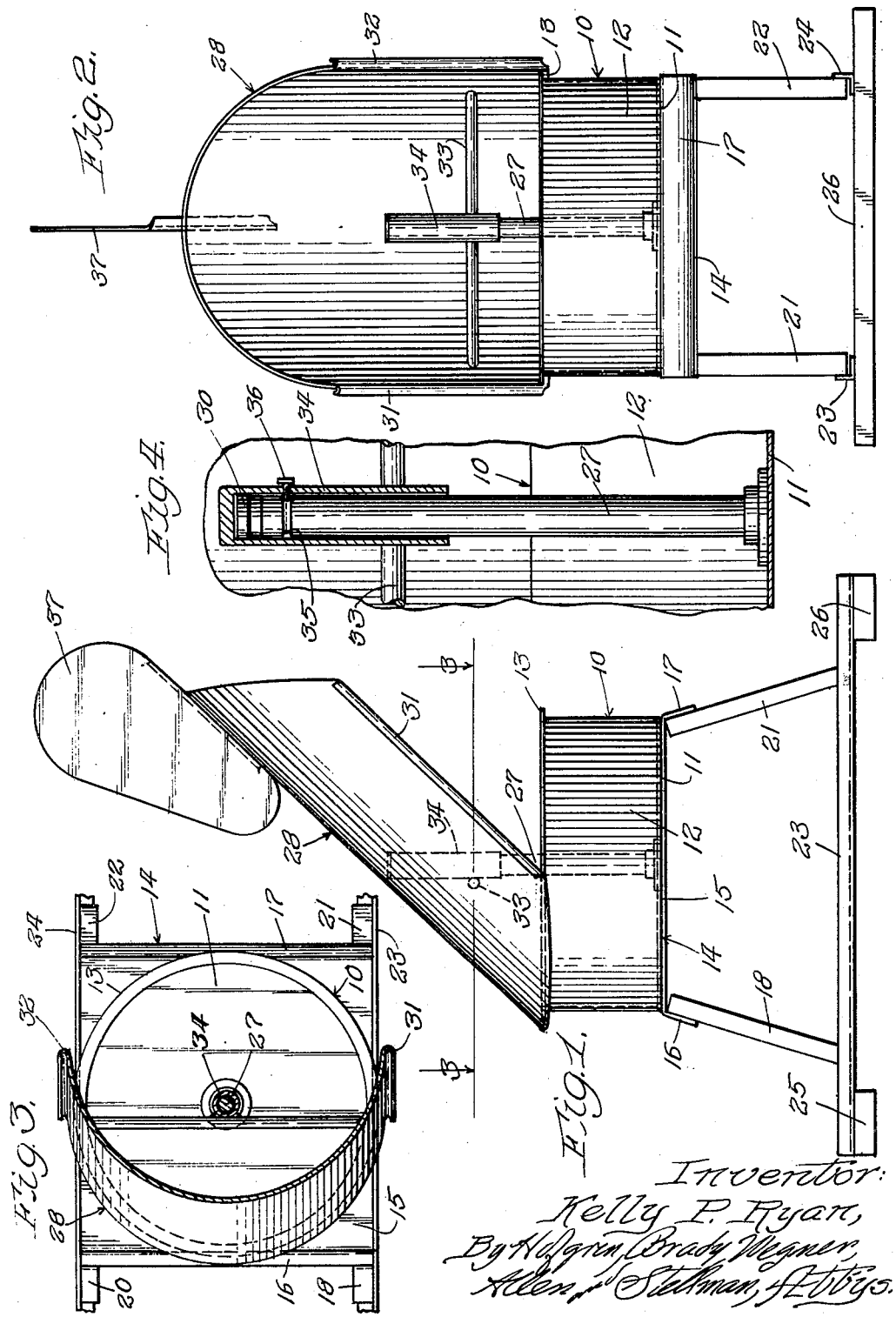
Inventor:
Kelly P. Ryan,
By Hofgren, Brady, Wegner,
Allen & Stellman, Attys.

United States Patent Office 3,007,443
Patented Nov. 7, 1961

3,007,443
CATTLE FEEDER STRUCTURE
Kelly P. Ryan, Blair, Nebr., assignor to Blair Manufacturing Co., Inc., a Nebraska corporation
Filed Nov. 13, 1959, Ser. No. 852,778
2 Claims. (Cl. 119—51)

This invention relates to a cattle feeder structure, and more particularly, to such a structure having a rotatable cover to afford protection from the rain and snow and yet to permit cattle access to mineral supplement or to other foods placed in the feeder device.

Heretofore, cattle feeder structures have been provided with cover members, but the cover members have been constructed and arranged so as to be rotatable only with the load of feed which is supported within the cattle feeder. Thus, even though the cover members were arranged so as to tend to turn into the wind and afford protection from the rain and snow, the rotatable part of the cattle feeder had a relatively high moment of inertia because of the load of feed so that it took a relatively large force to turn the cover member to a protective position. This relatively large moment of inertia of the rotatable part also encouraged cattle to scratch themselves upon the structure which is undesirable.

Even more importantly, such cattle feeder structures often became slightly tilted because of the earth being worn away by the cattle at the base of the device, which resulted in severe binding so that the cover and its load would not rotate at all. The present device obviates all of these prior deficiencies by providing a low inertia cover which is alone rotatable with respect to the load of feed in the device.

The primary object of the present invention is to provide a cattle feeder structure having an improved rotatable cover member for shielding the contents of the device from rain and snow and from foreign elements being carried by the wind currents.

Another object is to provide a cover member for such a cattle feeder structure which is provided with a wind vane and which is rotatable with respect to the container for the cattle feed so that the cover member is always turned into the direction from which the wind is blowing in order to shield, and yet permit access to, the cattle feed.

Another object is to provide a cattle feeder structure having a cover member which is separately rotatable with respect to the container for the cattle feed and which has an unusually low moment of inertia to insure turning of the cover member into the wind to afford protection to cattle feed in the container at all times.

The invention is illustrated in a preferred embodiment in the accompanying drawings, in which:

FIG. 1 is a side elevational view of the cattle feeder structure showing the spindle for rotatably supporting the protective cover member in dotted outline;

FIG. 2 is an elevational view taken from the right of FIG. 1;

FIG. 3, a sectional view taken as indicated on line 3—3 of FIG. 1, and

FIG. 4, an enlarged broken elevational view, partly in section, of the spindle for rotatably supporting the cover member.

In the embodiment illustrated, a cattle feed and mineral container, generally designated 10, is preferably provided with a bottom member 11 and an annular side wall 12 terminating at its upper end in an outwardly turned flange 13.

The container or food-receiving portion 10 is supported in generally upright position by a base frame, generally designated 14. The base frame 14 may include a top member 15, preferably of sheet metal, which has a pair of downturned marginal edge portions 16 and 17 at an opposite pair of its sides. A pair of supporting leg members 18 and 20 of L-shaped configuration are secured to opposite edge portion 16, and a similar pair of leg members 21 and 22 are secured in like manner to the opposite ends of the edge portion 17. The lower ends of each of the pairs of leg members may be secured to a pair of spaced, L-shaped metal rails 23 and 24, which, in turn, are secured at their opposite ends to a pair of transverse stabilizing runners 25 and 26, preferably of wooden construction.

An upright spindle or cover support 27 is preferably welded centrally of the bottom member 11 of the container 10, and is adapted at its free end for rotatably supporting a cover member, generally designated 28. As herein illustrated in FIG. 4, a thrust bearing 30 is provided at the free end of the cover support 27 freely and rotatably to support the cover member 28 in a manner later to be discussed.

The feeder structure of the present invention affords protection to the cattle feed during all types of inclement weather, and yet gives the cattle access to the feed in the container 10. To this end, the cover member 28, preferably formed of sheet metal, is provided. The cover member 28 may be arcuate in shape, and has at its opposite edge portions inclined integral troughs 31 and 32 which direct moisture from the roof of the cover member onto the ground. The cover member 28 is preferably disposed at an inclination and is of such length as to afford a protective shelter for the open top of the container 10. By inclining the cover member at an angle, an opening is afforded between the container and the upper peripheral marginal edge portion of the cover member to permit free access to the head of an animal feeding upon the contents of the container 10.

A transverse bar 33 may be spot-welded at its opposite ends to opposed inner surfaces of the cover member, and the central portion of the bar is preferably secured to an outer face of an upright hollow support 34. The hollow support 34 is preferably cup-shaped, as shown in FIG. 4, and is of a size to telescopingly receive the free end of the spindle 27 and its thrust bearing 30 whereby to rotatably support the cover member 28 separately from the container 10 for the cattle feed. The spindle 27 may have an annular groove 35 near its free end which cooperates with a threaded bolt 36 in the hollow support 34 to prevent the cover member 28 from becoming accidentally disengaged from the container 10. Of course, the bolt 36 is not advanced far enough in the hollow support 34 to engage the surface of the annular groove 35, but is merely advanced far enough to prevent accidental disengagement of the parts and yet to allow free rotatability to the cover member 28.

The cover member 28 is of such configuration so that its lower peripheral marginal edge portion (see FIGS. 1 through 3) extends below, and is outwardly spaced from, the periphery of the side wall 12 and its flange 13 to insure that no moisture will have access to the contents of the container 10. The upper end of the cover member 28 is preferably provided with a vane member 37 secured thereto, which vane member, in response to the force of the wind, turns the cover member 28 to proper protective position.

Thus, the structure of the present invention provides a cattle feeder device which can be filled with mineral supplement or the like and which can then be merely set in a barnyard or a feed lot. The cover member allows ready access by the cattle to the contents of the container 10. Yet, in inclement weather, the structure of the invention assures that the cover member will always be turned into the direction of the wind (the opening between the cover member 28 and the container 10 being turned away from the direction of the wind) so as to provide adequate protection from the rain or snow at all times.

The foregoing detailed description is given for clearness of understanding only and no unnecessary limitations should be understood therefrom, for some modifications will be obvious to those skilled in the art.

I claim:

1. A cattle feeder structure adapted to protect food for animals during inclement weather, comprising: a cylindrical container for the cattle food adapted to be supported in upright position; an arcuately curved protective cover member having a slightly greater diameter than said container and rotatably secured to said container and overlying substantially all of the container, said cover member having a lower peripheral marginal edge portion spaced outwardly from the periphery of said container and being provided with an upwardly disposed peripheral marginal edge portion spaced from the container to afford an opening permitting access to said food-receiving portion at all times; and means on the cover member responsive to wind currents so as to turn said cover member so that the opening is always turned to a position away from the wind currents.

2. A cattle feeder structure adapted to protect food for animals during inclement weather, comprising: a container having a bottom and a circular sidewall, said container being adapted to be supported in upright position; an upright cover support secured to the bottom of the container; an arcuately curved protective cover member having a supporting portion secured to its inner surface, said supporting portion being constructed to make a close telescoping fit with said cover support and being rotatable with respect thereto for rotatably supporting the cover member, said cover member overlying all of the container and being transversely arcuate in shape and having a pair of integral, longitudinally extending troughs at its opposite sides to direct moisture from the cover member away from the container, the cover member being supported in inclined position with respect to the container and having a lower arcuate, peripheral marginal edge portion and an upper arched peripheral marginal edge portion, said lower marginal edge portion overlapping and extending substantially 180° about the periphery of the side wall and being spaced outwardly therefrom, said upper arched peripheral marginal edge portion affording an opening above the sidewalls to permit access to the container at all times; and an upright vane member secured to the cover member, said vane member being responsive to wind currents so as to turn said cover member so that the opening between the cover member and the container is always turned to a position away from the direction of the wind currents.

References Cited in the file of this patent

UNITED STATES PATENTS

| | | |
|---|---|---|
| 2,556,446 | Gomer | Sept. 4, 1951 |
| 2,751,883 | Bacon | June 26, 1956 |
| 2,759,452 | Arthur | Aug. 21, 1956 |
| 2,826,171 | Piel | Mar. 11, 1958 |
| 2,841,116 | Nichols et al. | July 1, 1958 |